United States Patent
Burrows et al.

[11] Patent Number: 6,009,269
[45] Date of Patent: Dec. 28, 1999

[54] DETECTING CONCURRENCY ERRORS IN MULTI-THREADED PROGRAMS

[75] Inventors: Michael Burrows; Charles G. Nelson, both of Palo Alto, Calif.; Stefan Savage, Redmond, Wash.; Patrick G. Sobalvarro, Palo Alto, Calif.

[73] Assignee: Digital Equipment Corporation, Maynard, Mass.

[21] Appl. No.: 08/815,979

[22] Filed: Mar. 10, 1997

[51] Int. Cl.[6] .............................. G06F 9/45; G06F 11/00; G06F 9/46
[52] U.S. Cl. ...................... 395/704; 395/183.14; 395/677
[58] Field of Search .................... 395/704, 726, 395/677, 183.14; 711/168; 707/8

[56] References Cited

U.S. PATENT DOCUMENTS

| | | | |
|---|---|---|---|
| 5,335,344 | 8/1994 | Hastings | 395/183.11 |
| 5,440,743 | 8/1995 | Yokota et al. | 395/726 |
| 5,459,871 | 10/1995 | Van Den Berg | 395/674 |
| 5,469,575 | 11/1995 | Madduri | 395/200.56 |
| 5,539,907 | 7/1996 | Srivastava et al. | 395/705 |
| 5,590,335 | 12/1996 | Dubourreau et al. | 395/704 |
| 5,682,537 | 10/1997 | Davies et al. | 395/726 |
| 5,764,976 | 6/1998 | Hsiao | 707/8 |
| 5,835,766 | 11/1998 | Iba et al. | 395/679 |
| 5,845,117 | 12/1998 | Fujita | 395/677 |
| 5,862,376 | 1/1999 | Steele, Jr. et al. | 395/677 |

OTHER PUBLICATIONS

"Deadlock Detection Using Only Thread Identifiers"; IBM Technical Disclosure Bulletin; vol. 39, No. 1, pp. 29–30, Jan. 1996.

Dinning, A., and Schonberg, E., Detecting Access Anomalies in Programs with Critical Sections, ACM SIGPLAN Notices vol. 26, No. 12, pp. 85–96, Dec. 1991.

Mellor–Crummey, J., On–the–fly Detection of Data Races for Programs with Nested Fork–Join Parallelism, Supercomputing '91, pp.24–33, 1991.

*Primary Examiner*—Tariq R. Hafiz
*Assistant Examiner*—Brian Sattizahn
*Attorney, Agent, or Firm*—Pennie & Edmonds, LLP

[57] ABSTRACT

A computer implemented method detects concurrency errors in programs. Machine executable images of multiple program threads are instrumented to locate and replace instructions which affect concurrency states of the threads. Concurrency state information is recorded in a memory while the multiple threads are executing. The recorded concurrency state information is analyzed, and inconsistent dynamic concurrency state transitions are reported as concurrency errors.

19 Claims, 9 Drawing Sheets

_DETECTING CONCURRENCY ERRORS IN MULTI-THREADED PROGRAMS_

FIELD OF THE INVENTION

This invention relates generally to concurrently executing program threads in computer systems, and more particularly to detecting concurrency errors.

BACKGROUND OF THE INVENTION

In complex computer systems, multiple execution paths, or "threads" can be used to speed up processing. For example, interactions with users may be handled by foreground threads, while compute intensive operations such as database updates can be handled by background threads. Alternatively, parallel threads can be executed on multiple processors to improve performance.

It is a problem to detect concurrency errors. One type of concurrency error is a "deadly embrace," or a dead-lock condition. A dead-lock condition exists, for example, where a thread A "owns" a shared resource X, and also needs to acquire a resource Y. The resource Y is owned by a second thread B, which needs to acquire resource X. The result is a resource conflict. Typically, a dead-lock situation causes the system to stop functioning in its intended manner.

Another type of concurrency problem is a race condition. A race condition may exist if data states depend on the speed and order of thread execution. For example, a thread may need to read data at an address which can be written to by other threads. The actual data that are read will depend on the order of reading and writing by the individual threads. The non-determinism resulting from such race conditions can cause the program to produce erroneous results.

Prior art techniques are known to statically check for concurrency errors. Prior art techniques typically prove the theorem that the program is correct, or "true."

The problem is that an exact locking order, or data access sequence can vary dynamically while the threads are executing. Such variations are not detectable with a static checker. Therefore, it is desired to dynamically check for concurrency errors.

SUMMARY OF THE INVENTION

Provided is a computer implemented method for detecting concurrency errors in programs. Machine executable code of multiple program threads is instrunented to locate and replace instructions which affect concurrency states of the threads. The replacement instructions will call procedures of a monitor.

The monitor procedures record concurrency state information in a memory while the multiple threads are executing. The recorded concurrency state information can be analyzed, and inconsistent concurrency state transitions can be reported as concurrency errors.

In one aspect of the invention, the instructions which are replaced are instructions which acquire and release locks. In this case, the recorded state information is the locking order of locks. Cycles in the locking order are indicative of dead-lock conditions.

In another aspect of the invention involving heaps, for every address of a heap, a shadow address is maintained in a shadow heap. This can be done by locating and replacing memory allocation and deallocation instructions. In this case, the recorded state information is related to the order data are accessed. Inconsistent access orders are reported as data race conditions.

DETAILED DESCRIPTION OF PREFERRED EMBODIMENTS

Figure 1:
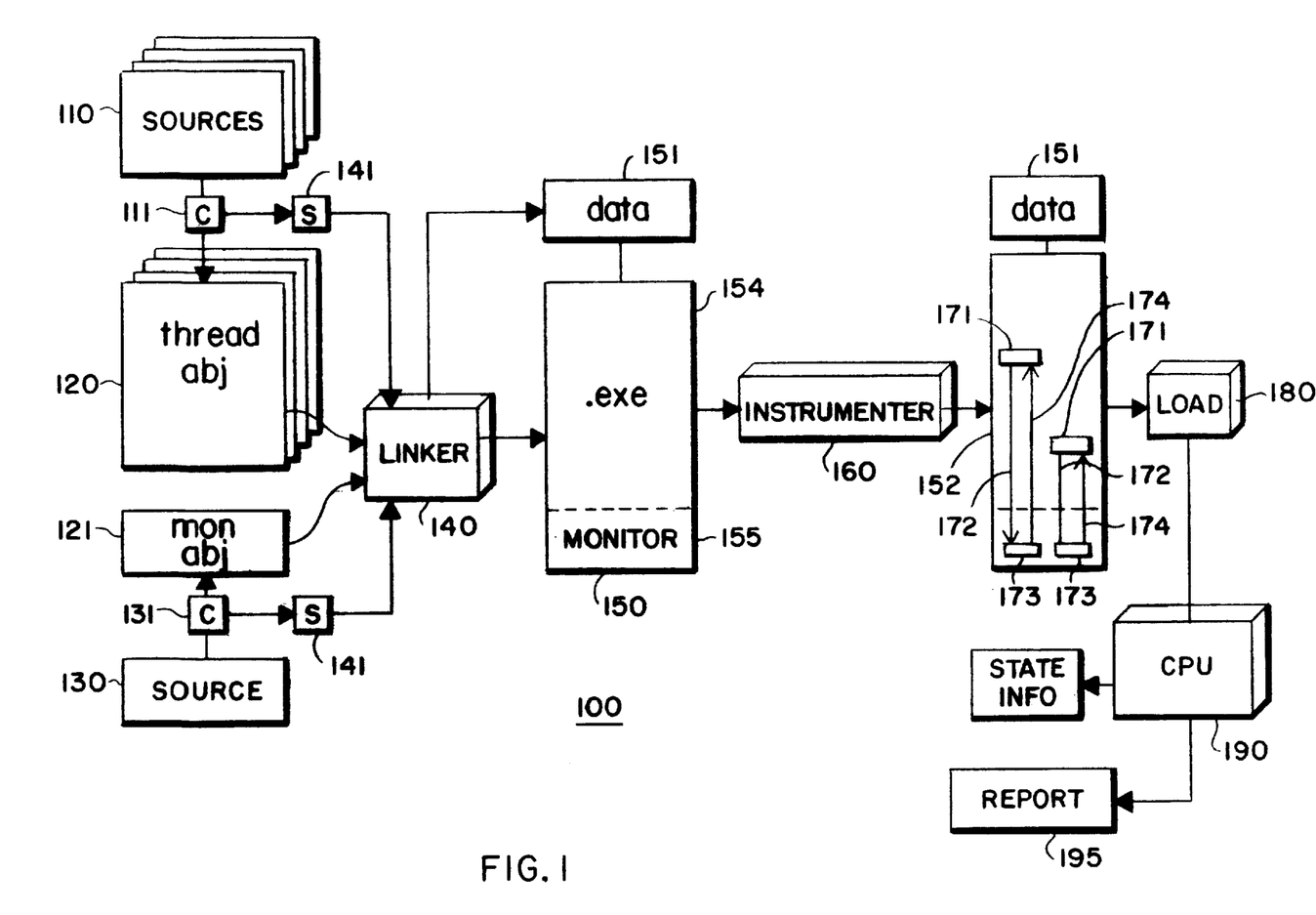
FIG. 1 is a block diagram of a process for dynamically detecting synchronization errors in programs.

FIG. 1 shows a process 100 which can be used for dynamically detecting concurrency errors of multiple program threads. A programmer generates source programs 110 using conventional programming techniques. The source programs 110, once processed, are intended to execute concurrently in a computer system (CPU) 190. The system 190 includes a memory and a processor, or multiple memories and processors used in conjunction. The programs 110 can be compiled by a compiler 111 into object modules (thread obj) 120.

A monitor program 130, which is to report on the behavior of the source programs 110 while they are executing, is also generated. The exact details of how the monitor program 130 can report on execution of the source programs 110 will be described in greater detail below. The monitor program 130 is compiled by compiler 131 into object module (mon obj) 121. A linker 140 links the object modules 120–121 into a machine executable image (.exe) 150. The executable image 150 is sometimes known as the "binary" program or "text." The integrated portion of the image 150 which is to report on the execution of the threads is called the "monitor" 155.

It should be noted that the linker 140 can have access to symbol tables 141 generated by the compilers 111 and 131. Using the symbol tables 141, the linker 140 can resolve, for example, data references and procedure calls that are common among the object modules. It should also be noted that the compiling and linking of the programs can also produce a data section (data) 151 storing constant values which are passed along with the text portion 150 of the program For the purpose of one embodiment, the program text or executable image 150 includes only machine executable instructions, e.g., operands and operators. All data are stored separately in the data section 151.

The executable image 150 is modified or "patched" by an instrumenter 160. Instrumentation is a process which locates and replaces selected instructions of the image 150. An example instrumenter which can be used is described in U.S. Pat. No. 5,539,907, _System for Monitoring Computer System Performance_, issued to Srivastava et al. on Jul. 23, 1996.

Each selected instruction is overwritten with one or more replacement instructions, for example, the replacement instruction can be a jump-to-subroutine instruction (jsr) 171. The jsr instruction can "call" 172 one of the procedures 173 of the monitor 155. The procedures 173 are designed to examine, record, and analyze concurrency states of the system at the time the selected instruction is about to execute.

In order to speed-up processing in an alternative embodiment, the calls 172 can be implemented as in-line instructions. That is, the in-line instructions implement the procedures 173. Therefore, in the description below, the calls 172 can refer either to a subroutine call or the equivalent in-line instruction of the routine called.

After machine executable code 150 has been instrumented it is stored back in the memory of the system. For this reason, instrumentation is sometimes known as a "binary rewrite."

The modified machine code 150 can be loaded into the processor 190 by a loader 180. While running the program, the inserted "calls" 172 intercept thread execution. The procedures 173 record selected concurrency state information 195 about the system. The recorded state information can be analyzed to report 196 the behavior of the program with respect to the states.

For example, locking in an inconsistent order, or storing data in an inconsistent order, may reflect concurrency errors. After the monitor procedures 173 complete, the "replaced" instruction can be executed, and normal execution of the program thread can resume via return-from-subroutine instructions 174. Concurrency errors can be reported while the programs are executing, or after the monitoring completes.

The specific instructions 171 replaced during instrumentation depend on which thread concurrency states are to be analyzed and reported. In order to detect deadlock conditions, all machine instructions which call procedures which are used to acquire and release locks are instrumented. In order to detect race conditions, all machine instructions which call procedures which are used to acquire and release locks are instrumented, and, in addition, data access instructions, e.g., loads and stores, as well as memory allocation and deallocation calls are also instrumented.

Figure 2:
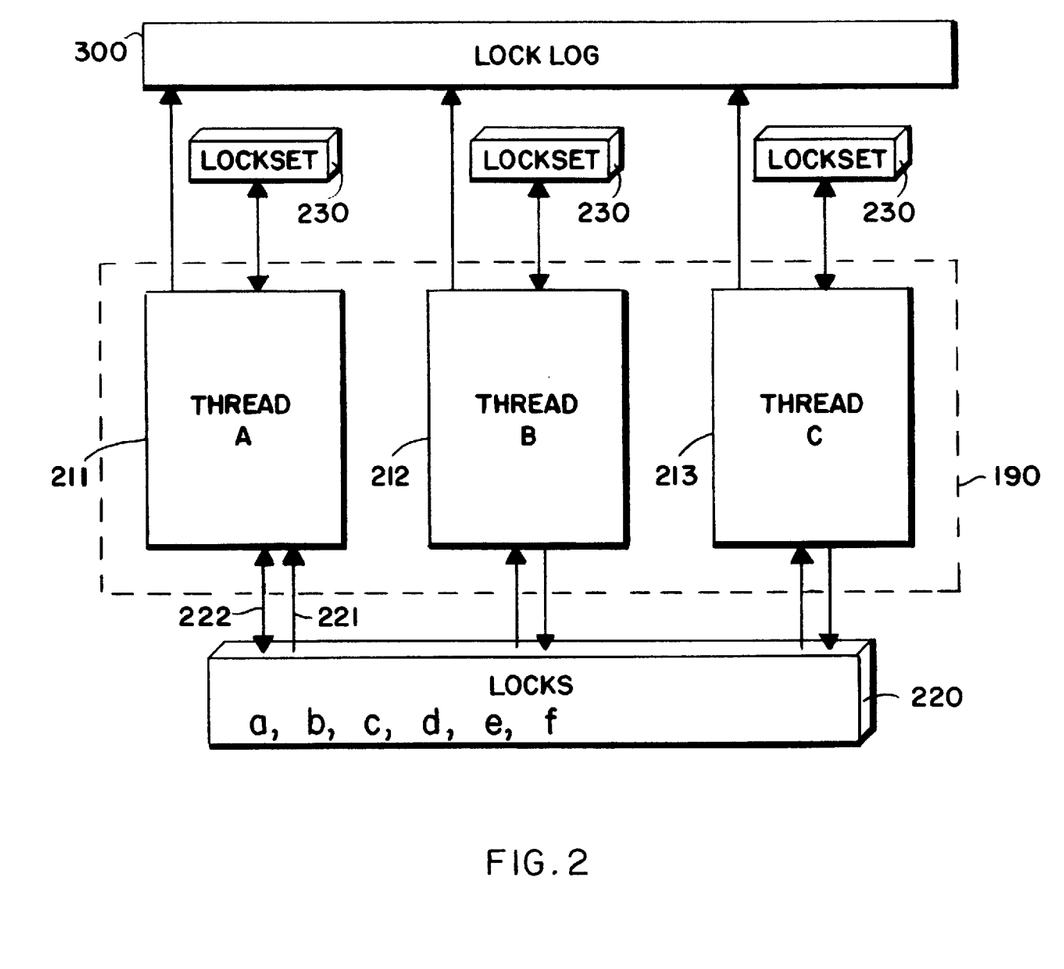
FIG. 2 is a block diagram of multiple threads and lock sets.

Now with reference to FIG. 2, the detection of dead-lock concurrency errors is described. In the system 190, a plurality of threads (A, B, C) 211–213 are concurrently executing instructions. The threads 211–213 have access to locks (a, b, . . . , e, f) 220 for synchronizing their activities, for example, accesses to shared resources.

In order to synchronize on a predetermined activity, a thread makes a call 221 to acquire an associated lock. By holding the lock, the thread can exclude other threads from using the same shared resource. Once the activity has completed, a call 222 releases the lock. It may be possible that a single call may acquire or release multiple locks. The specific locks which are manipulated can be passed as arguments of the calls 221–222. If a desired lock is not available, e.g., it is held by some other thread, then the acquiring thread can be held in a wait state until the lock becomes available.

The present method for detecting deadlock conditions assumes that the order in which locks are to be correctly acquired is prescribed in advance. This is a common discipline for managing the acquisition of locks in multi-process and multithreaded programs. As a counter example, thread A holds lock a and thread B holds lock b. In order to proceed, thread A also needs lock b, and thread B needs lock a. In this case of conflicting acquisition orders, neither thread can proceed. This is a classical case of dead-lock.

In a complex execution environment, thousands of locks may be used to synchronize processing activities. Consistent locking behavior can be monitored, to some extent, statically. If the order in which locks are acquired is dependent on a particular execution, then it becomes extremely difficult to detect dead-lock situations, because the number of permutations in different locking orders becomes quite large.

Therefore, the monitor 155 of FIG. 1 maintains data structures which store concurrency state information related to the order in which locks are acquired and released while the threads are executing. This state information can be analyzed to detect errors in locking order before the programs are made available for general use.

If the instrumenter 160 locates and patches all the calls 171 to lock management procedures, then every time a lock is acquired or released, the execution flow of the threads can be intercepted by one of the procedures 173 of FIG. 1.

More specifically, the monitor maintains for each thread a lock set 230. Whenever a lock is acquired, the lock becomes a member of the lock set 230 associated with the thread. When the lock is released, the lock is deleted from the set. For example, if thread A acquires locks a, b, c, and later releases lock b, then its lock set has members {a, c}.

Figure 3:
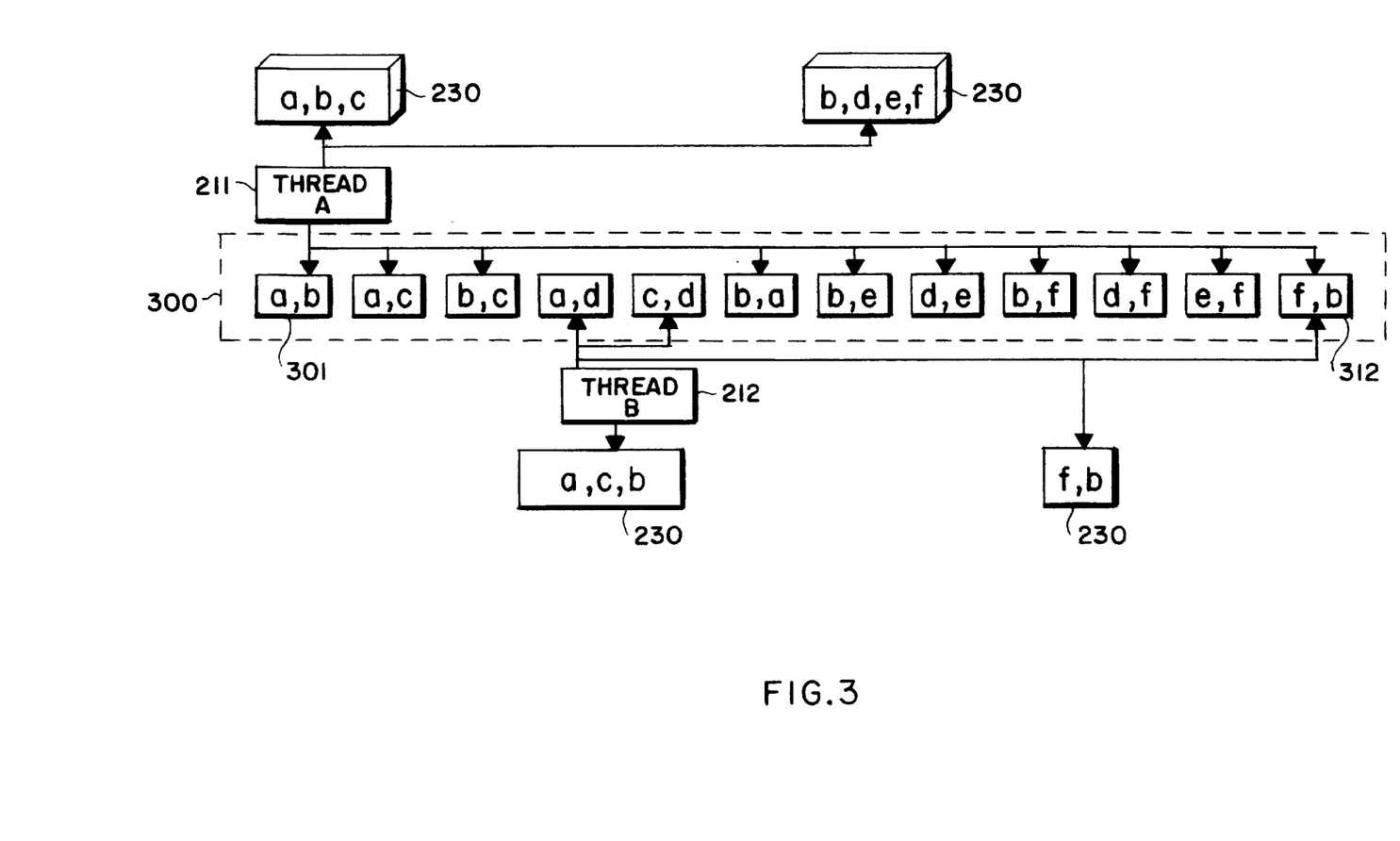
FIG. 3 is a block diagram of a lock log.

In addition, the monitor records all lock acquisitions in a lock log 300. As shown in FIG. 3, the acquired locks are logged as ordered pairs 301–312 as follows. For example, thread A acquires, in order, the locks a, b, and c. When lock b is acquired, the pair (a, b) 301 is recorded in the log. This indicates that lock b was acquired after lock a. Subsequently, when thread acquires lock c, then the pairs (a, c), and (b, c) are also recorded because locks a and b are both still members of thread A's lock set when lock c was acquired.

In the case where the locking order is not changed during the monitoring of the program's execution, an optimization that exploits the ordering relation is possible. In this optimization, the set of locks held by a thread is maintained in chronological order from least recently acquired to most recently acquired. With this optimization, when a new lock is acquired by a thread, only the pair consisting of the previous most recently acquired lock and the lock being acquired is stored in the log.

Therefore in the general case, whenever a thread acquires a lock, a pair is stored in the lock log 300 for every combination of a current member of the thread's lock set with the newly acquired lock. In other words, the pairs express the order of locking. If the lock log 300 already records an identical pair, the new pair is, not recorded. That is the log stores unique pairs only. Two pairs expressing locks acquired in a different order, e.g., (a, b) and (b, a) are not identical.

The example log 300 of FIG. 3 shows thread B acquiring locks a, c, and d. At a later time thread A has released locks a and c, but has acquired locks d, e, and f. Then, thread B releases locks a, c, and d, but acquires locks f and b. The last lock acquisition is reflected in the log 300 as the pair (f, b) 312.

Figure 4:
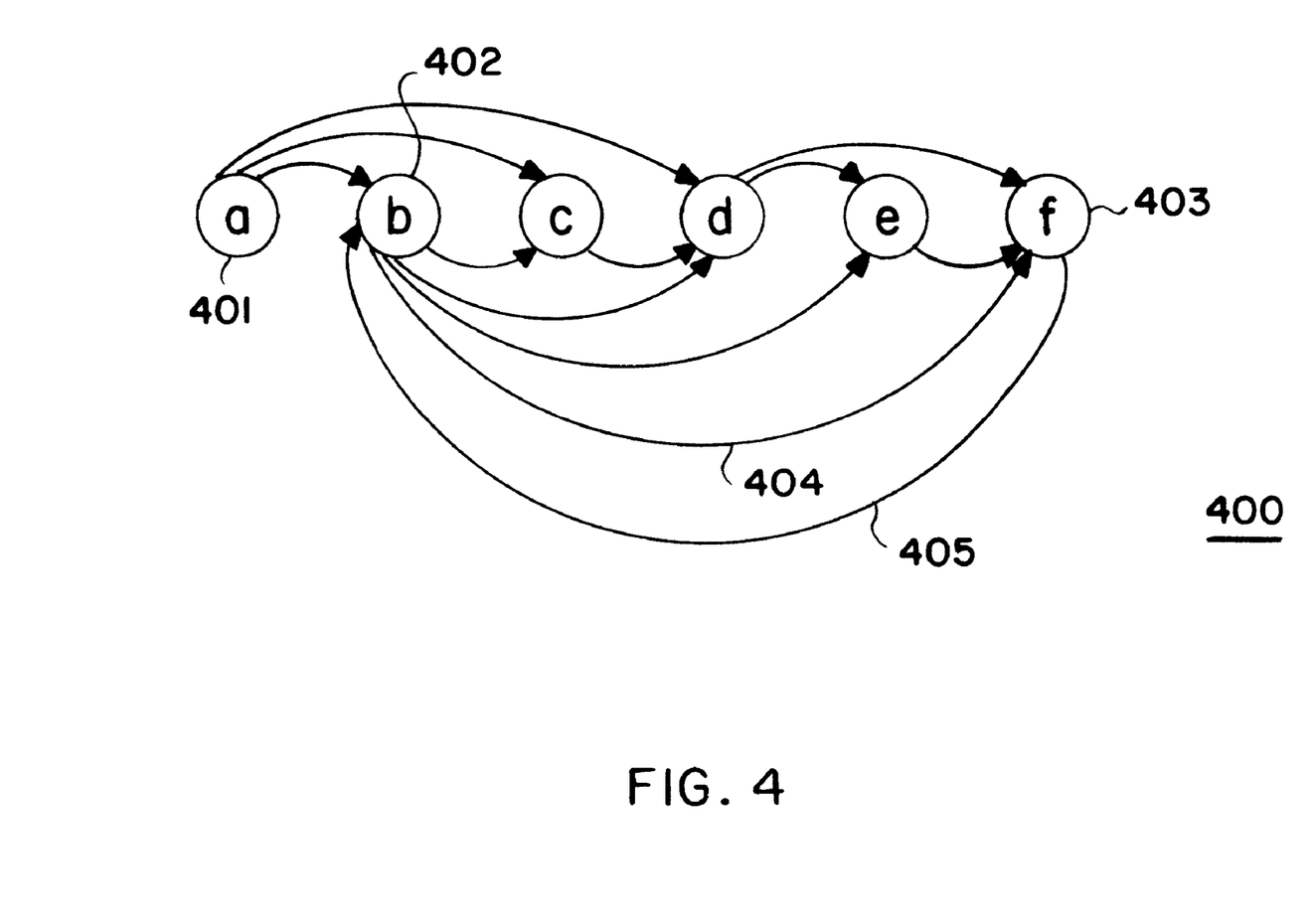
FIG. 4 is a block diagram of a lock ordering graph.

FIG. 4 shows a graphical representation 400 of the lock log 300 of FIG. 3. Here, each lock is a node 401–403 in the lock ordering graph 400, and the directed edges 404-405 between pairs of nodes indicate the relative order in which the locks were acquired.

It should now be apparent that the example locking order has resulted in nodes 402 and 403 having two interconnecting edges 404 and 405 in opposite directions. This is called a cycle. A cycle indicates that threads are acquiring locks in a conflicting order. Cycles in directed graphs can be detected by performing a topological sort on the pairs of the lock log 300.

Topological sorts for other applications are generally described by D. Knuth, *The Art of Programming, Volume I,*

*Fundamental Algorithms*, Addison-Wesley, 1968, pp. 258–268. Cycles are evidence of a potential dead-lock situation, and are therefore reported.

It should be noted that the absence of a cycle in the lock ordering graph 400 does not imply that the program is absolutely dead-lock free, because other resource synchronization mechanisms can be involved in a dead-lock condition. In addition, there may be another set of input data which could cause the threads to acquire locks in a different order. In general, dynamically checking for concurrency errors can only verify that the threads lock properly for a particular execution of the programs.

Another type of concurrency error is a data race condition. Race conditions occur when multiple threads access data at the identical address. For example, two threads both read data with intent to modify. In this case, the final data state depends on which thread completes first.

In most operating systems, the scheduler has the freedom to run threads (at the same priority level) in any order, subject only to synchronization constraints. In a multiprocessor system, execution can progress at different speeds depending on, for example, cache misses and other load conditions of the different processors. Therefore, if the time to complete can dynamically vary, so can the final data state.

If each shared datum is protected with a lock, then data races can be avoided. Among multiple threads of large programs, it is difficult to statically ascertain which locks are associated with which data.

Figure 5:
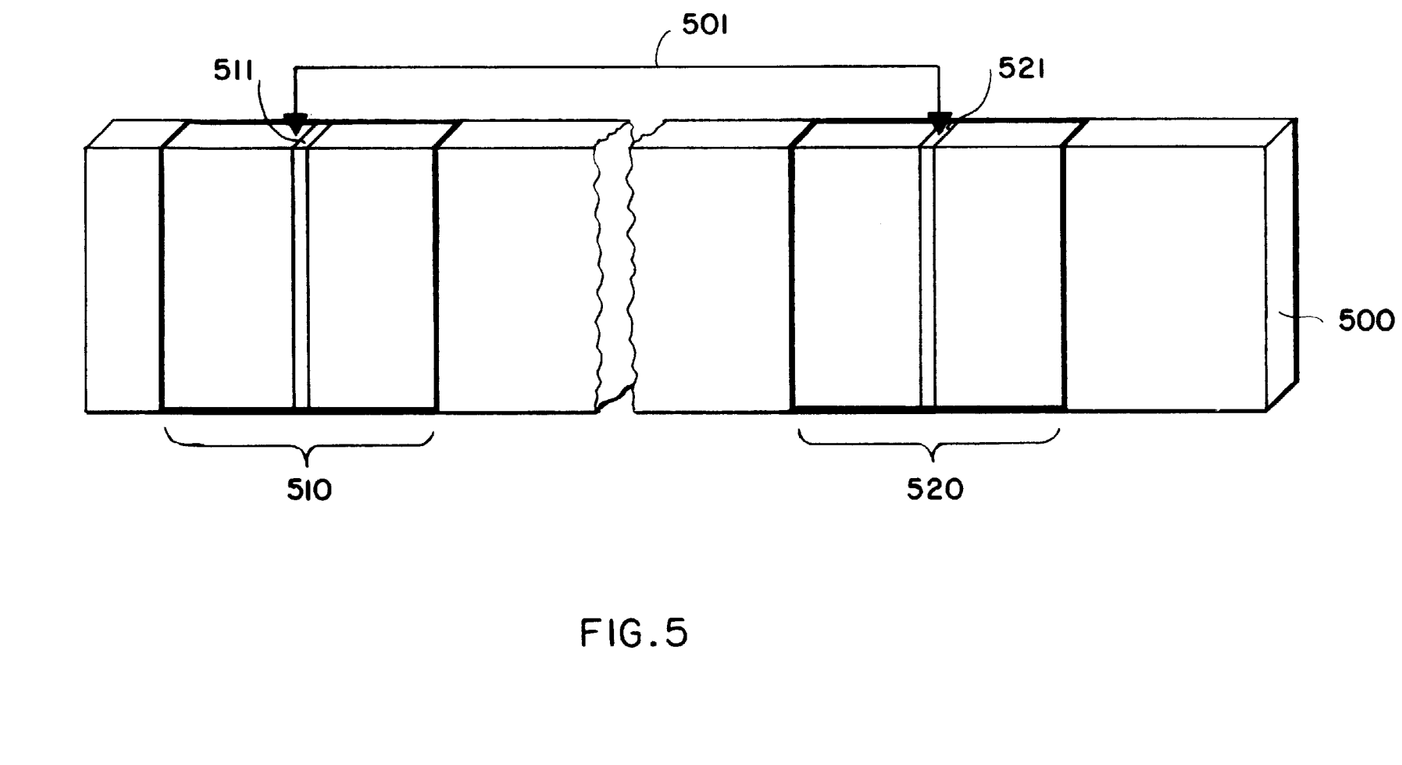
FIG. 5 is a block diagram of a heap and shadow heap.

FIG. 5 shows a data structure which can be used to detect data race conditions at the address level. A random access memory (RAM) 500 stores data at addresses of a "heap" 510. The heap 510 can concurrently be accessed by multiple program threads to share data.

The data are stored at unique addresses, such as address 511. The addresses can be virtual memory addresses. This means that the total amount of dynamic physical memory (DRAM) is less than what can be addressed. In one possible virtual memory system, the address 511 could be expressed as a 32 bit value, allowing for the addressing of four Gigabytes of memory, only a small fraction of which might be implemented as physical memory. It should be understood that this is just one of many variations, for example, 64 bit words may be used just as well.

For every address of the heap 510, a shadow heap 520 is also maintained. This means there is a one-to-one correspondence 501 between address 511 and 521. The shadow heap 520 will be used to store access concurrency state information. This means, whenever data at an address of the heap is accessed, current data access concurrency information is updated at the corresponding address of the shadow heap 520 if the algorithm so requires.

The machine executable code 150 of FIG. 1 is modified as follows. All instructions 171 which access addresses of the heap (loads and stores), are replaced by calls 172 to the procedures 173 of the monitor 155. In addition, any calls by the code 150 to procedures which allocate and deallocate addresses of the heap 510 are also replaced with calls to monitor procedures. This later activity is done to ensure that the shadow heap 520 accurately reflects the addresses of the heap 510.

Figure 6:
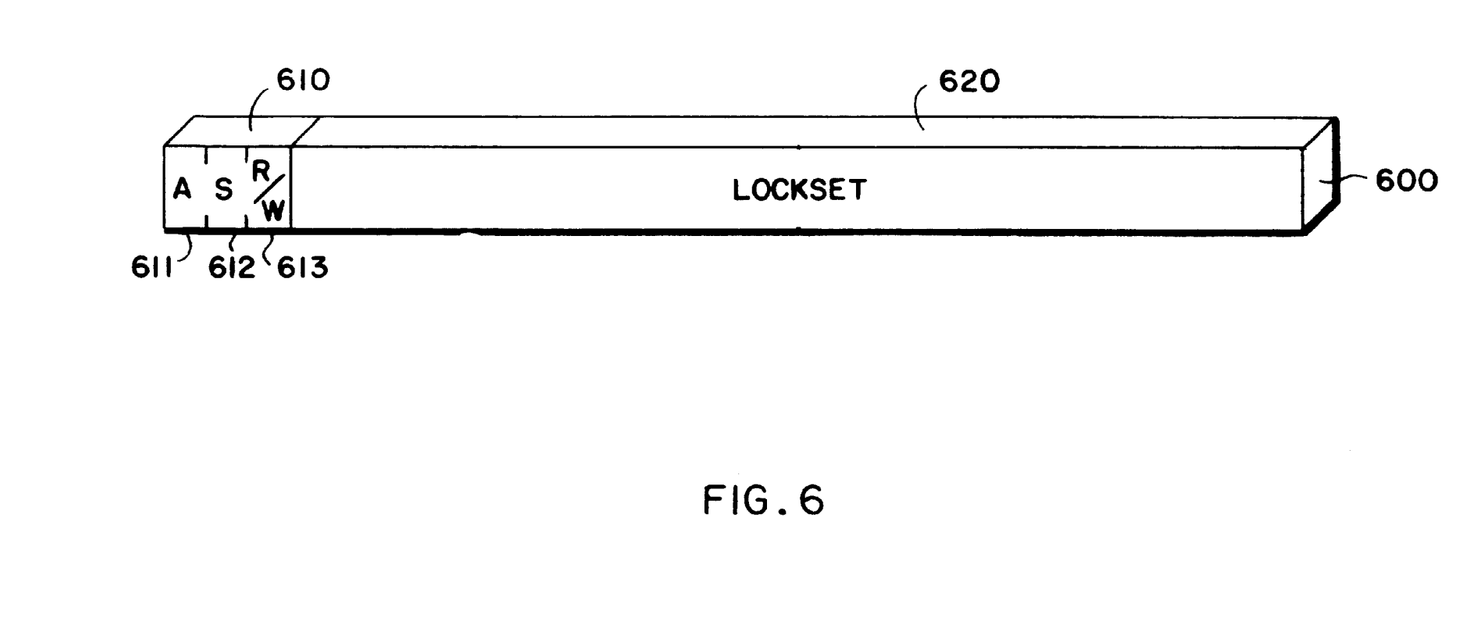
FIG. 6 is a block diagram of a lock set.

FIG. 6 shows a word 600 at one of the addresses of the shadow heap 520. The word 600 has two fields, an access state field 610, and a lock set state field 620. As will be described below, in certain implementations the state field 620 can include two sub-fields. The access state field 610 can have one to three bits, e.g., access (A), shared, (S), and read/write (R/W) 611, 612, and 613.

The address of the word 600 can be allocated to the shadow heap 520 as the corresponding address of the heap 510 is allocated. The word 600 can be initialized to have all bits set to zero. This indicates that the corresponding word at the heap address has never been accessed. Upon deallocation of a word in the heap, the corresponding word in the shadow heap is deallocated and any information it previously stored is lost. The deallocation may happen through an explicit call in the program to a library deallocation routine, or it may be through an automatic storage reclamation routine, such as a garbage collector, that has been annotated as described below.

Figure 7:
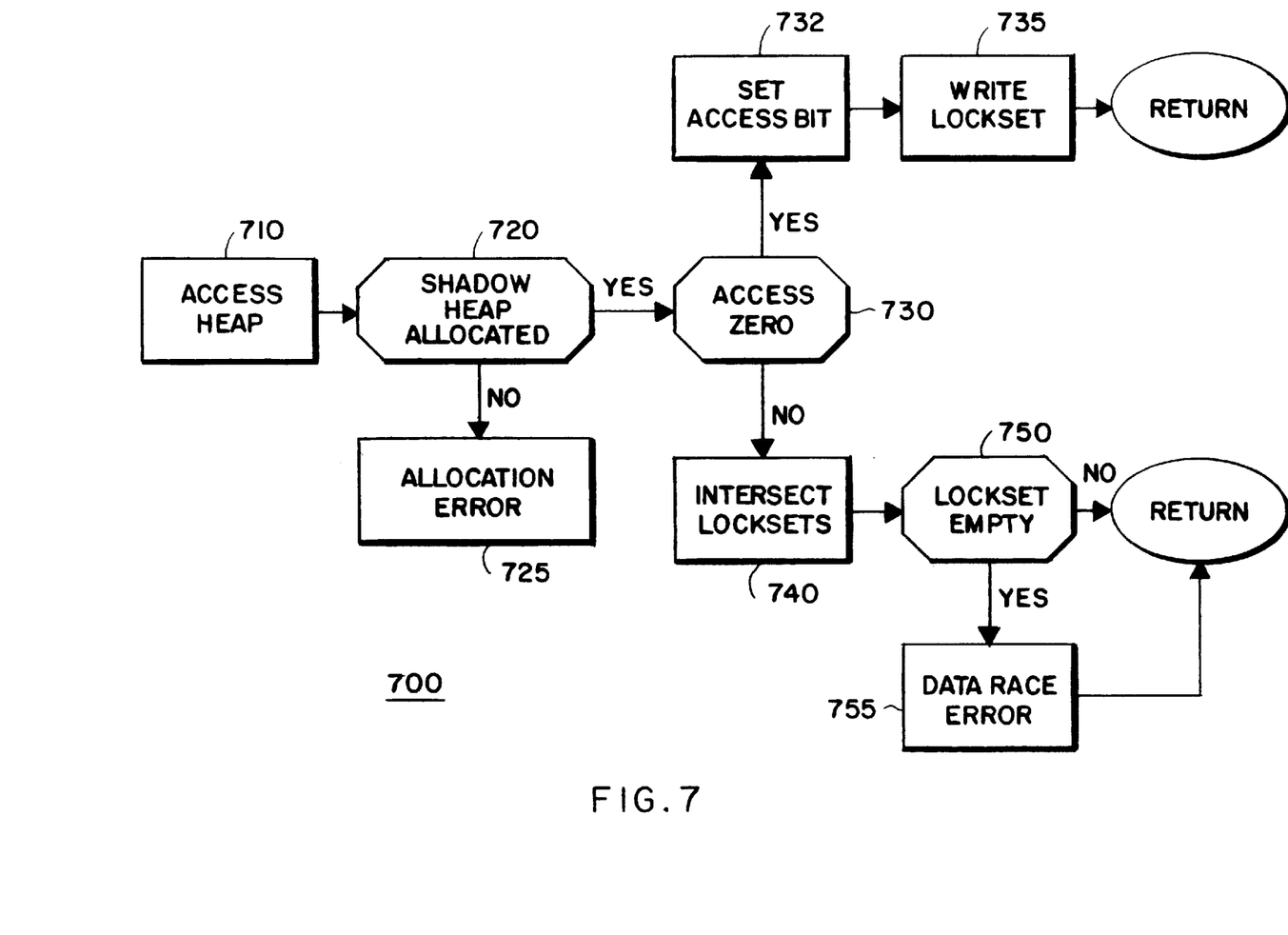
FIG. 7 is a flow diagram of a process which checks for concurrent access errors.

FIG. 7 shows a process 700 which can be used to maintain shadow heap 520. When any thread 211 of FIG. 2 is about to access data at an address of the heap 510, step 710, determine in step 720 if the corresponding address of the shadow heap 520 has been allocated. The absence of a shadow heap address detects an erroneous attempt to access an unallocated portion of the heap 510, step 725.

If the value stored at a valid shadow heap address is zero (no previous accesses, step 730), then in step 732 set the access bit 711 of the state field 610 to a logical one, and write the current lock set associated with the accessing thread to the lock set field 620, step 735. Resume executing the thread after executing the replaced instruction. The exact details on how the lock set is stored at addresses of the shadow heap 520 will be described below. In actual fact as described below, the lock set state field 620 stores a pointer to an array element where the lock set is stored. Therefore, "writing" the lock set implies storing a pointer in word 600.

Subsequently, another access to the same address will detect that the access bit 711 is not zero. In this case, take the intersection of the lock set of the thread accessing the address and the lock set stored at the shadow address, and store the remaining lock set in the lock set field 620, step 740. If the lock set field 620 is empty after taking the intersection, step 750, e.g., there are no common outstanding locks, a possible data race condition exists for the address, step 755, otherwise return. Deallocating the address, will cause the word 600 to be reset to its initial all zero value.

This technique may erroneously signal data race conditions. These are known as a false alarms. False alarms may happen if only a single thread is accessing the data.

Figure 8:
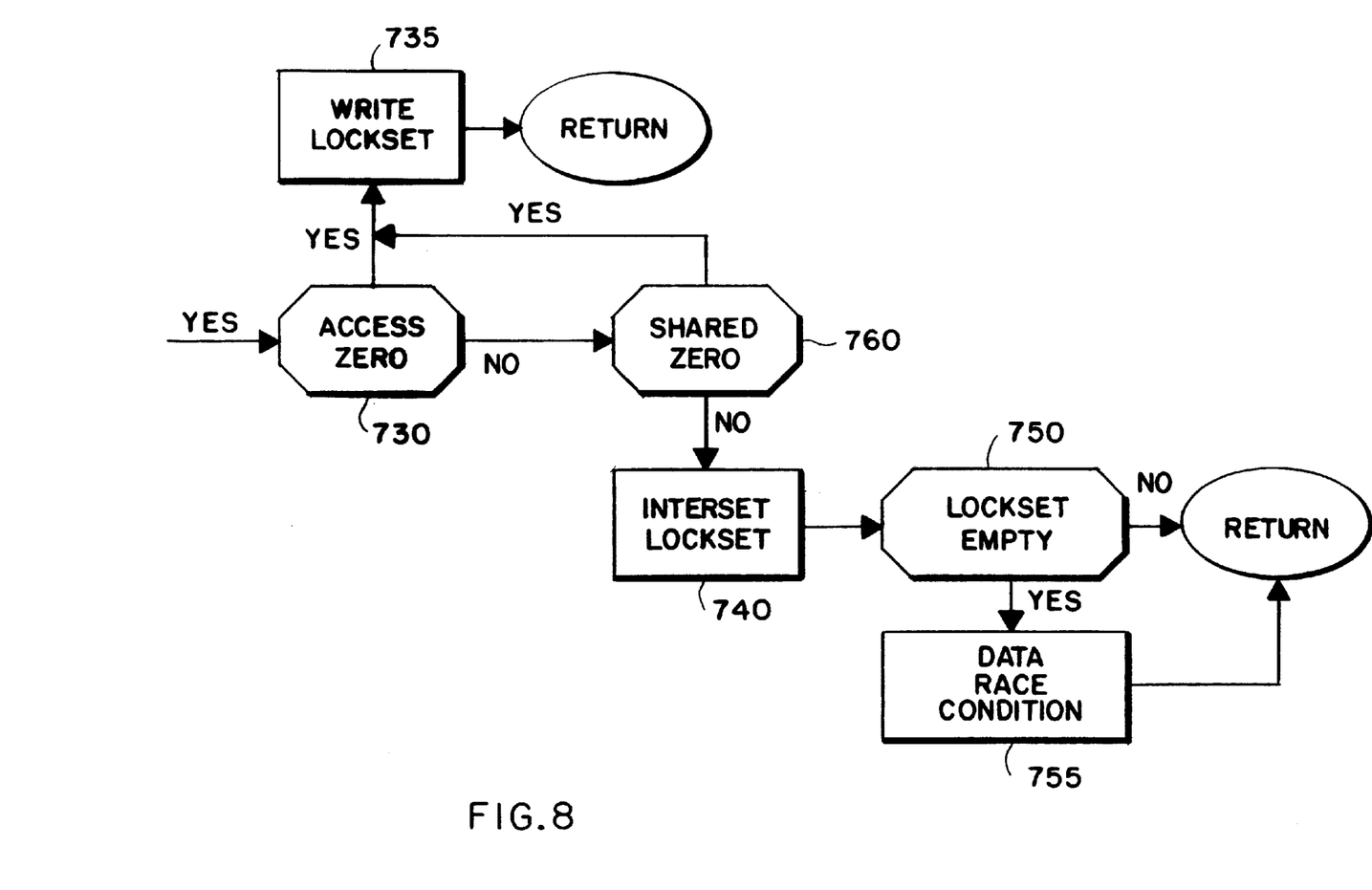
FIG. 8 is a modified flow diagram which checks for concurrent shared access errors.

FIG. 8 shows how the process 700 can be modified to do a more discriminating concurrency detection. In this variation, if the access bit 711 is non-zero, an additional check is done (step 760) on the shared bit 712. While the shared bit 712 is zero, a thread identifier is stored in a field of the shadow address.

On subsequent accesses, if the shared bit 712 is still zero, the identifier of the accessing thread is compared with the identifier stored at the shadow address. If the identifiers are different, then shared bit 712 is set to a logical one to indicate that at least two threads have accessed the address.

A lock set is not stored at the shadow address until the shared bit 712 is set to a one, because no error checking needs to be done until the address has been shared by more than one thread. Because the thread identifier and the lock set need never be stored at the shadow address at the same time, the same field 620 of the shadow address can be used to store these values at different times.

As long as the shared bit 712 remains a zero, the process simply writes the identity of the thread in the lock set field 620 of the shadow address, step 735. In this case, the lock sets are no longer intersected as long as the same thread continues to access data at the address. If the shared bit 711 is set to a one, then intersect and check for an empty set 740 and 750.

However, this technique may be too coarse for some applications and may still cause false alarms. For example, in many data processing systems, many addresses are initialized once by a thread but are never written again, even though many threads may subsequently read these addresses. In this case, locks are not needed to protect the address once it has been written for the last time. Therefore, the concurrency checking technique described above may report many false alarms.

The R/W bit 613 stored at the shadow address is used to overcome this problem The bit is ignored until the shared bit 612 is set. Once the shared bit 612 is set, the R/W bit 613 is set to a one on any following write access. If the shared bit 612 is set due to a write access, then the R/W bit 613 is also immediately set.

Updates to the lock set 620 stored at the shadow address 600 proceed normally, irrespective of the state of the R/W bit 613. The effect of the R/W bit 613 is to suppress error messages when the bit is zero, because no access errors can occur unless at least two threads have accessed data at an address (the shared bit 612 is set to a one), and the address is being written by at least one of the threads after a sharing of the address (the R/W bit is set to one).

One possible programming convention that is sometimes used protects data stored at a single address with more than one lock. In this convention, threads must acquire all the locks before the data can be modified, but a thread may need only one lock to read the data. The present technique can be modified to accommodate this programming convention. On a write access, the process can update the shadow address as described above. On a read access, the lock set intersection and test for an empty set is also done as above. However in this case, the lock set stored at the shadow address is not updated with the intersected set.

The concurrency error detection scheme can be further improved to handle single-writer/multiple reader locks where the locks can be acquired in one of two modes; read-mode and write-mode. If a thread acquires a lock in write-mode, then the thread is guaranteed that no other thread holds the lock in any case. If a thread acquires the lock in read-mode, then the only guarantee is that no other thread holds a lock in write-mode.

Single-writer/multiple reader locks allow multiple threads to concurrently read data stored at an address. This is similar to the concept of protecting an address with multiple locks. However, the implementation considerations are different, as is the manner in which locks are accommodated in the present concurrency error detection scheme.

So far in this description, only a single lock set has been associated with a thread. Locks are added and removed from the set as locks are acquired and released by the thread. In order to accommodate single-writer/multiple reader locks, two lock sets are associated with each thread: a read-set, and a write-set.

When a write lock is acquired, it is added to both sets, and the lock is removed from the two sets when the lock is released. For a read lock, the lock is only added to, and removed from the read-set. The processing of the information at the shadow address is similar to what is described above, except that only the read-set is used during read accesses, and the write set is used during write accesses.

Figure 9:
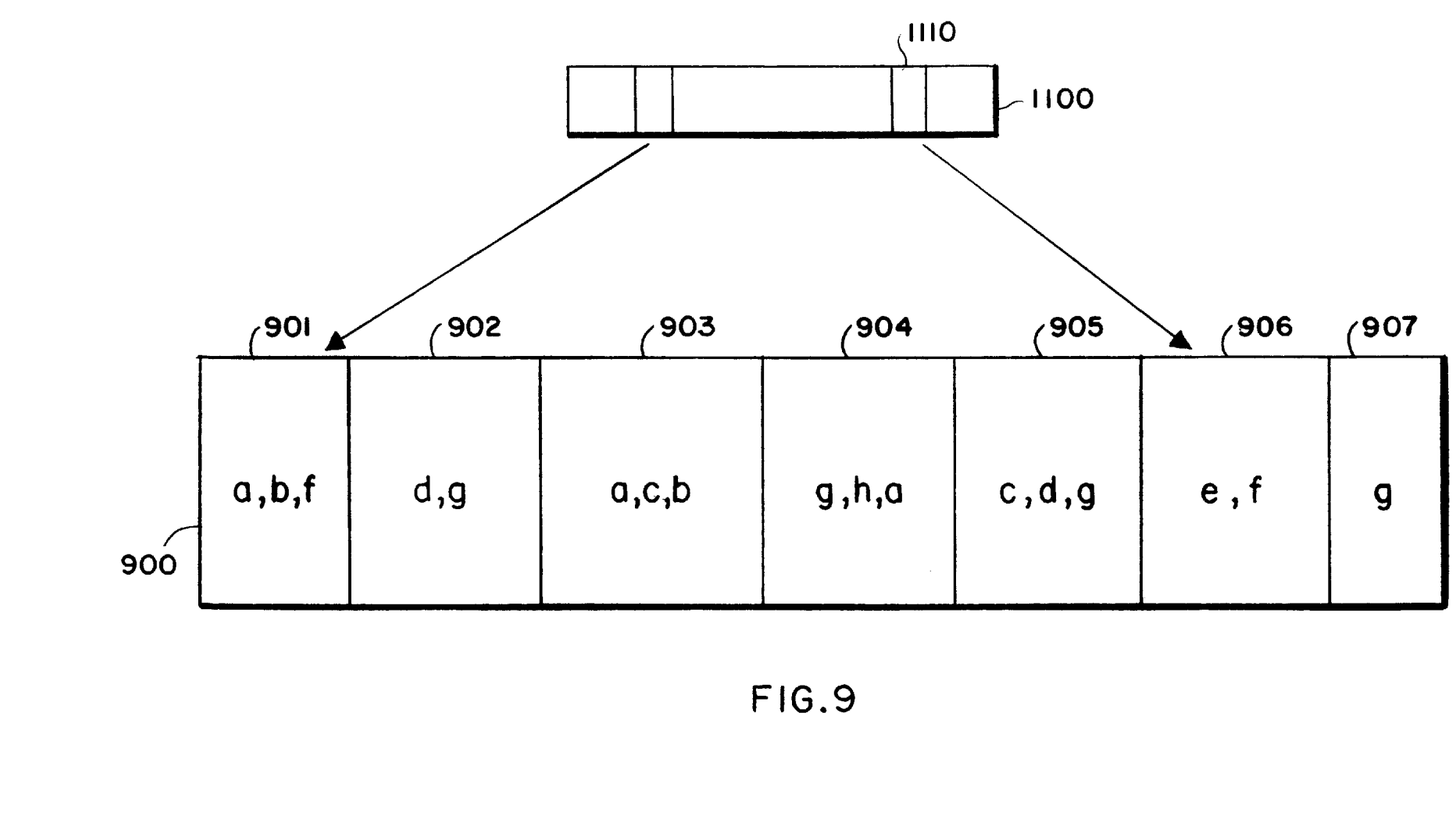
FIG. 9 is a block diagram of a lock set array and hash table.

The preferred way of organizing lock sets and pointers to lock sets are now described in greater detail. FIG. 9 shows an array 900 including a plurality of lock sets 901–907. Each entry in the array 900 is a unique set of locks. In actual practice, the number of different lock sets will be small, and therefore, the table 900 can in most cases be stored in the main memory. The entries of the table 900 are permanent during a particular monitoring session. This means, that the entries are not modified or deleted from the table 900.

Associated with each lock set is a small integer value which is used as an identification. The identification is an index into the array 900. Entries in the table 900 are created sequentially starting with entry "zero," then entry one, and so forth. The index into the array is the identification of the entry. It is these identifiers which are actually stored in the lock set state fields 620 of FIG. 6.

To keep the table small, an entry is never added to the array 900 more than once. Therefore, an auxiliary hash table 1100 is maintained. Every time a lock set entry is generated in the array 900, a hash table entry 1110 is also generated. The hash key value is derived by applying a hashing function directly on the lock set. The lock set identification (array index) is stored in the corresponding hash table value. Thus, during operation, the lock set can be uniquely identified.

As with the technique for detecting deadlocks, the results generated by the use of these methods for detecting race conditions are dependent on the particular program execution that is monitored. Different input data or slightly different sequences of events may lead to different execution paths through the program. Because of this, not all potential race conditions may be detected when this method is used. There may also be potential race conditions reported when, in fact, synchronization has occurred through some mechanism other than locking, and the race condition could not occur in practice.

As a further improvement, the programs to be checked can be annotated. Program annotations are "signals" put in the program to indicate the programmer's intention. Annotations have no effect on the execution of a program. As an advantage, the annotation can be checked during execution to refine the concurrency error detection process.

An example source annotation can be in the form of a call to a "null" procedure with predetermined arguments. The null procedure, as the name implies, does nothing but return to the regular execution flow. Calls to null procedures can be identified by the instrumenter 160. These calls can be replaced by calls to procedures 173 of the monitor 155 which interpret the arguments. Alternatively, the annotations can be in the form of calls to procedures of the monitor. These procedures can be identified in the symbol tables 141.

For example, an annotation may indicate that the next allocation is for memory addresses which can only be accessed in shared mode by read instructions. Another annotation, can indicate that the allocated memory is private to the thread. It should be apparent that such annotations can decrease the number of false alarms.

Another example of an annotation that can be added in the case of deadlock detection is an annotation that indicates that the locking order used in the program is being changed. For example, such an annotation might indicate that a position of a lock in the locking order has changed, and all pairs that included it were to be removed from the log.

In the case of dynamic race detection, if a program provides automatic storage reclamation (garbage collection), an annotation in the form of a call to the monitor can be included in the source of the program, to indicate that a range of storage is being reclaimed and should be deallocated from the shadow heap.

The foregoing description has been directed to specific embodiments of this invention. It will be apparent, however, that variations and modifications may be made to the described embodiments, with the attainment of all or some of the advantages. Therefore, it is the object of the appended claims to cover all such variations and modifications as come within the spirit and scope of the invention.

We claim:

1. A computer implemented method for detecting concurrency errors including deadlock conditions and data race conditions in programs, comprising:

instrumenting machine executable code of multiple threads of the programs to locate and replace instructions which affect concurrency states of the threads, including instructions which acquire and release locks;

recording concurrency state information in a memory while the multiple threads are executing;

analyzing the recorded concurrency state information; and reporting inconsistent dynamic concurrency state transitions as either deadlock conditions, data race conditions or other concurrency errors.

2. The method of claim 1 further comprising:

locating instructions which acquire and release locks;

replacing the located instruction with instructions to intercept an execution flow;

recording an order in which the multiple threads acquire and release locks while executing; and reporting cycles in the order in which the multiple threads acquire locks as deadlock conditions.

3. The method of claim 2 further comprising:

calling one or more monitoring procedures when intercepting the execution flow of any one of the multiple threads.

4. The method of claim 1 further comprising:

maintaining, for each thread, a current lock set associated with the thread;

adding a lock to the lock set when the lock is acquired;

deleting the lock from the lock set when the lock is released; and recording the order in which the locks are acquired in a lock log.

5. The method of claim 1 further comprising:

maintaining a read lock set for read accesses; and maintaining a write lock set for write accesses.

6. A computer implemented method for detecting concurrency errors in programs, comprising:

instrumenting machine executable code of multiple threads of the programs to locate and replace instructions which affect concurrency states of the threads;

recording concurrency state information in a memory while the multiple threads are executing, including:

maintaining a read lock set for read accesses;

maintaining a write lock set for write accesses;

adding a read lock to the read lock set for read accesses; and adding a write lock to the read lock set and the write lock set for write accesses;

analyzing the recorded concurrency state information; and reporting inconsistent dynamic concurrency state transitions as concurrency errors.

7. A computer implemented method for detecting concurrency errors in programs, comprising:

instrumenting machine executable code of multiple threads of the programs to locate and replace instructions which affect concurrency states of the threads;

recording concurrency state information in a memory while the multiple threads are executing, including:

maintaining, for each thread, a current lock set associated with the thread;

adding a lock to the lock set when a new lock is acquired by storing lock set pairs in the lock set, the pairs being every unique combination of a current member of the lock set and the new lock that is not a member of the lock set;

deleting the lock from the lock set when the lock is released; and recording the order in which the locks are acquired in a lock log; analyzing the recorded concurrency state information; and reporting inconsistent dynamic concurrency state transitions as concurrency errors.

8. The method of claim 7 further comprising:

for each pair, storing the pair in a determined order so that either the current member of the lock set is recorded in a first position and the new lock in a second position, or the current member of the lock set is recorded in the second position and the new lock is stored in the first position.

9. The method of claim 8 wherein the pairs of the lock log are represented as an ordered lock graph further comprising:

a node for each lock; and a directed edge connecting a first lock to a second lock, the direction of the edge indicating the order in which the first and second lock were acquired.

10. The method of claim 9 further comprising:

performing a topological sort on the lock graph.

11. The method of claim 10;

wherein a first node and a second node are connected by a first edge and a second edge directed in opposite directions; and further comprising reporting the locks associated with the first and second node as a concurrency locking error.

12. A computer implemented method for detecting concurrency errors in programs, comprising:

instrumenting machine executable code of multiple threads of the programs to locate and replace instructions which affect concurrency states of the threads, including: (a) memory allocation and memory deallocation instructions so that for every address of a heap, a shadow address in a shadow heap is maintained and (b) instructions which access data at the addresses of the heap, replacing the access instructions with instructions to invoke monitoring procedures;

recording concurrency state information in a memory while the multiple threads are executing, including recording lock set information at the corresponding shadow addresses using the monitoring procedures;

analyzing the recorded concurrency state information; and reporting inconsistent dynamic concurrency state transitions as concurrency errors, including reporting accesses by the access instructions that are inconsistent with the recorded lock set information as data race conditions.

13. The method of claim 12 further comprising:

detecting an access to an allocated address of the heap.

14. The method of claim 13 further comprising:

intersecting current lock set information of a current accessing thread with stored lock set information of a previous thread accessing the address of the heap; and reporting a data race condition if the intersection of the sets is empty.

15. The method of claim 14 further comprising:

storing the intersection of the current and stored lock set information if the current and previous lock sets are different.

16. The method of claim 15 further comprising:

writing the intersection of the current and stored lock sets if the access is a write to the address.

17. The method of claim 12 further comprising:

recording the lock sets in entries of an array; and storing a pointer to a particular entry of the array at every shadow address associated with the lock set stored at the particular entry.

18. The method of claim 17 further comprising:

determining a hash value from a particular lock set; and storing the pointer in a hash table as determined by the hash value.

19. The method of claim 12 further comprising:

storing an identity of an accessing thread when the thread access is unshared.

* * * * *